Sept. 16, 1947.  J. W. RICHARDSON ET AL  2,427,510
WHEEL ANTI-SKID EQUIPMENT
Filed March 28, 1946   5 Sheets-Sheet 1

INVENTORS
Joseph W. Richardson
Joseph Cuneo
BY
Kenyon & Kenyon
ATTORNEYS

Sept. 16, 1947.    J. W. RICHARDSON ET AL    2,427,510
WHEEL ANTI-SKID EQUIPMENT
Filed March 28, 1946    5 Sheets-Sheet 2
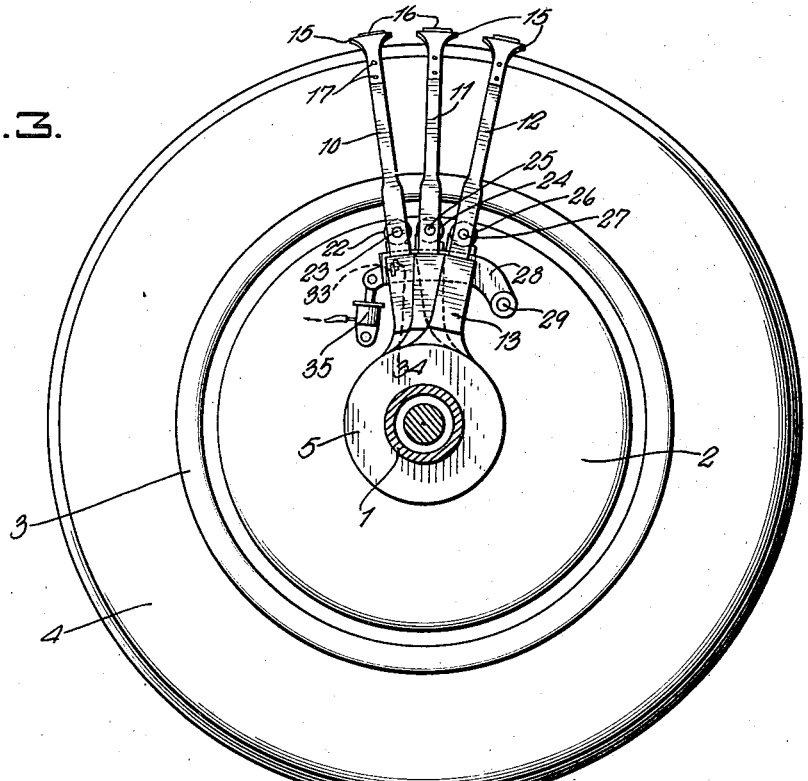
INVENTORS
Joseph W. Richardson
Joseph Cuneo
BY
Kenyon & Kenyon
ATTORNEYS

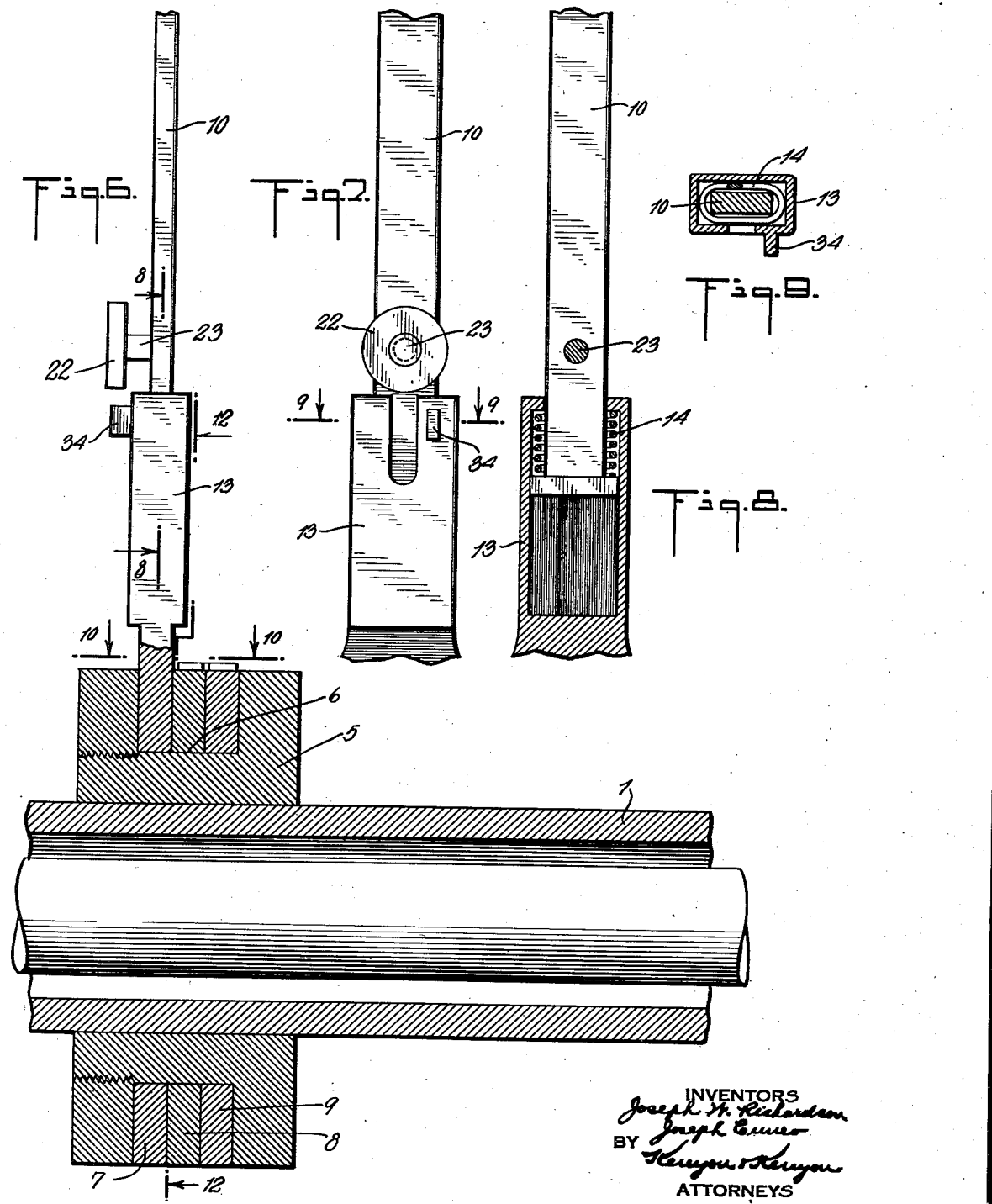

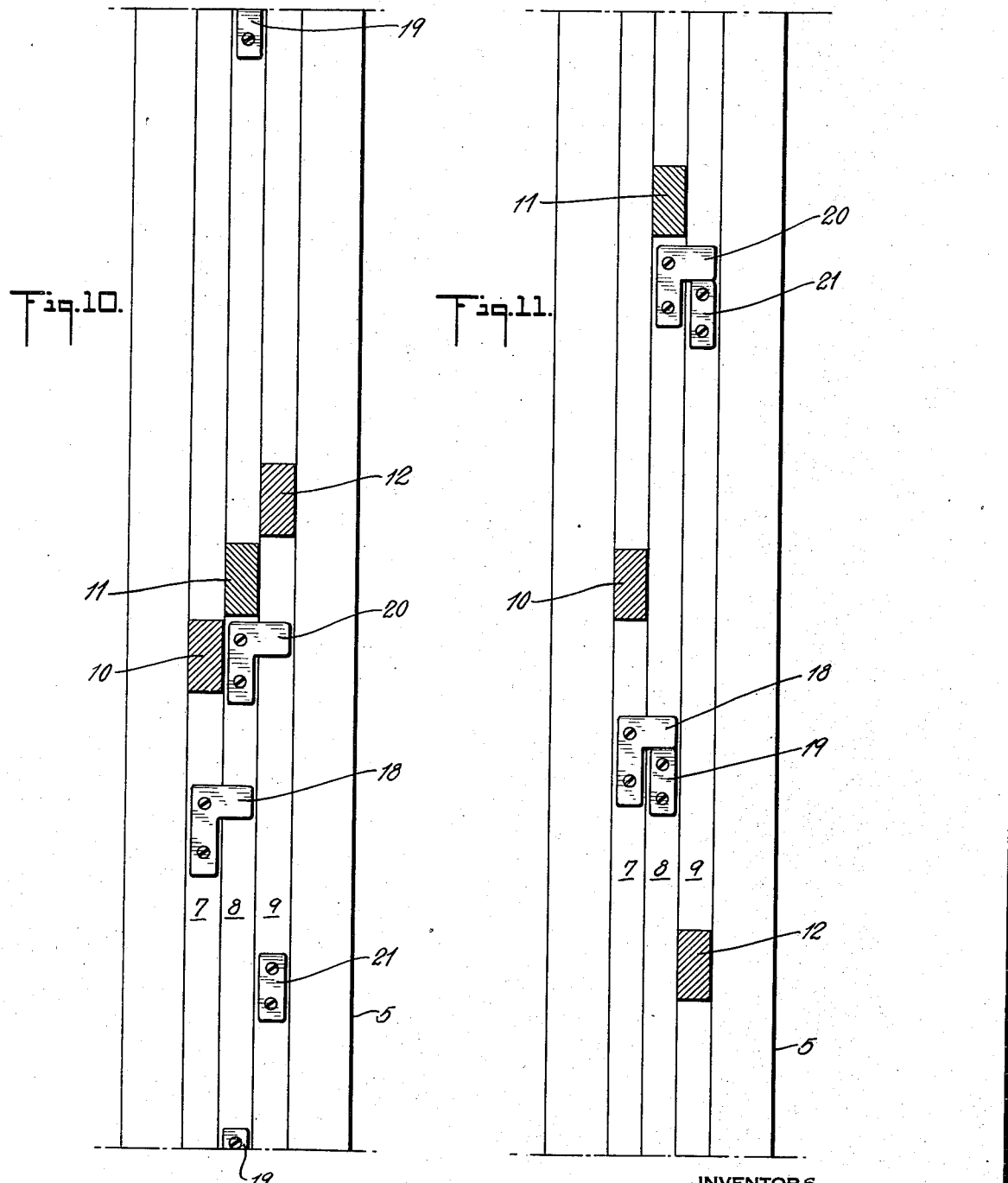

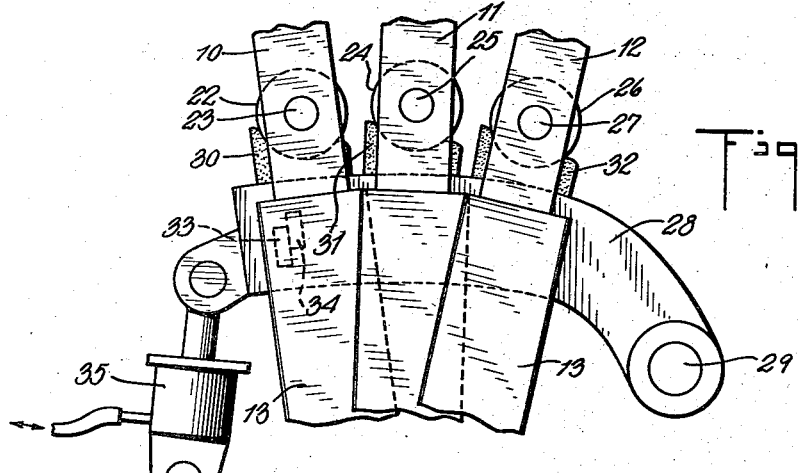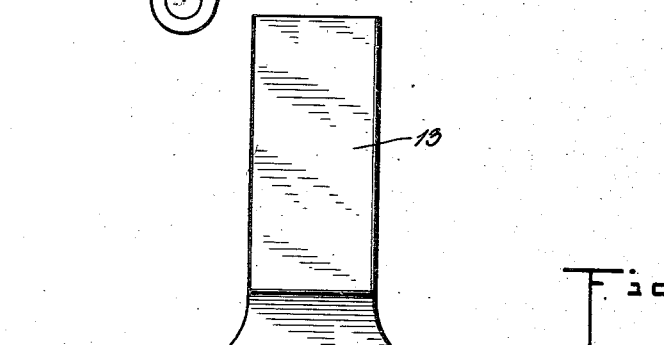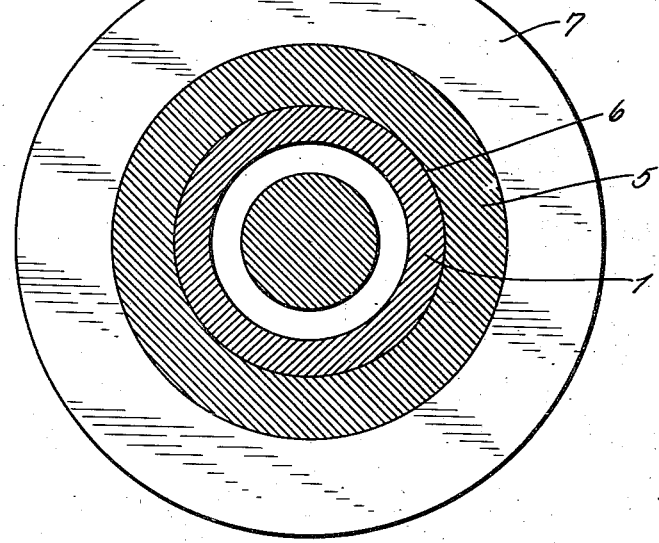

Patented Sept. 16, 1947

2,427,510

UNITED STATES PATENT OFFICE 2,427,510

WHEEL ANTISKID EQUIPMENT

Joseph W. Richardson and Joseph Cuneo,
Wood-Ridge, N. J.

Application March 28, 1946, Serial No. 657,684

6 Claims. (Cl. 152—214)

This invention relates to wheel anti-skid equipment of the type that is permanently attached to a vehicle and by remote control rendered operative or inoperative as the wheel operating conditions indicate. It is adapted for use on automobiles, for example, where it may be applied to the driving wheels and remotely operated from the driver's seat, thus eliminating the need for the driver to dismount, use his jack and apply conventional chains.

A specific example of such wheel anti-skid equipment embodying the principles of the present invention is illustrated by the accompanying drawings in which:

Fig. 3 is similar to Fig. 1, the former showing the anti-skid device equipment in operative position and the present figure showing it in inoperative position;

Figs. 4 and 5 are side and top views, respectively, of the anti-skid element;

Fig. 6 is a partly sectioned view taken from the line 6—6 in Fig. 1;

Fig. 7 is a side view of a detail in Fig. 6;

Fig. 8 is a section taken from the line 8—8 in Fig. 6;

Fig. 9 is a section taken from the line 9—9 in Fig. 7;

Figs. 10 and 11 are developments of rotative elements; and

Figs. 12 and 13 are enlargements of details in Figs. 1 and 3.

Figure 1:
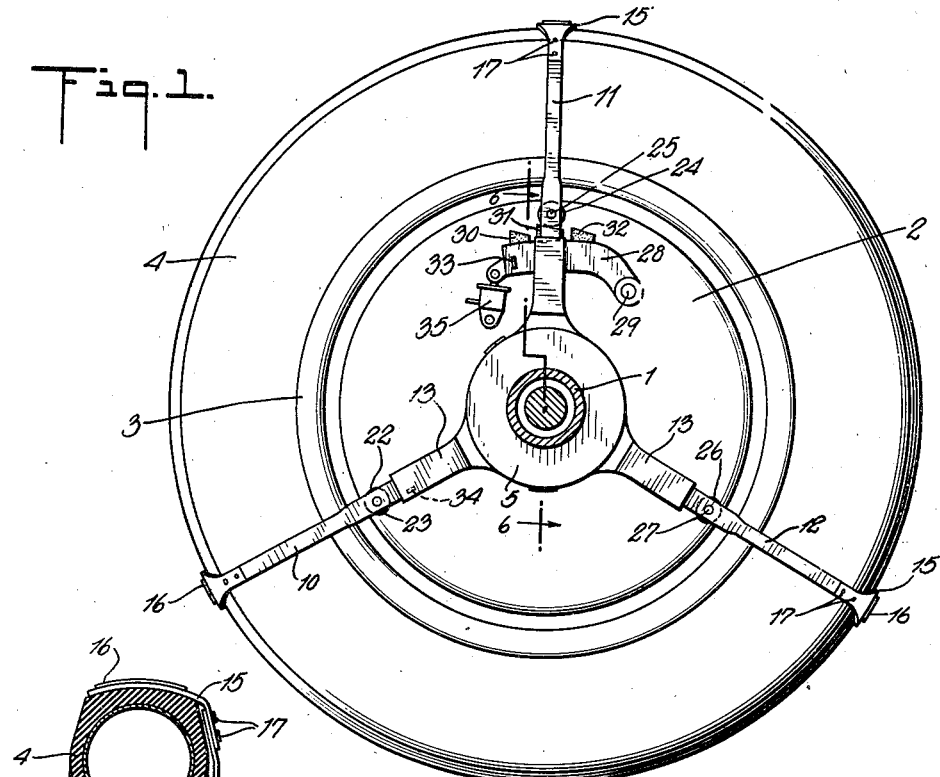
Fig. 1 is a side view of an automobile rear driving wheel with the equipment applied to it.
Figure 2:
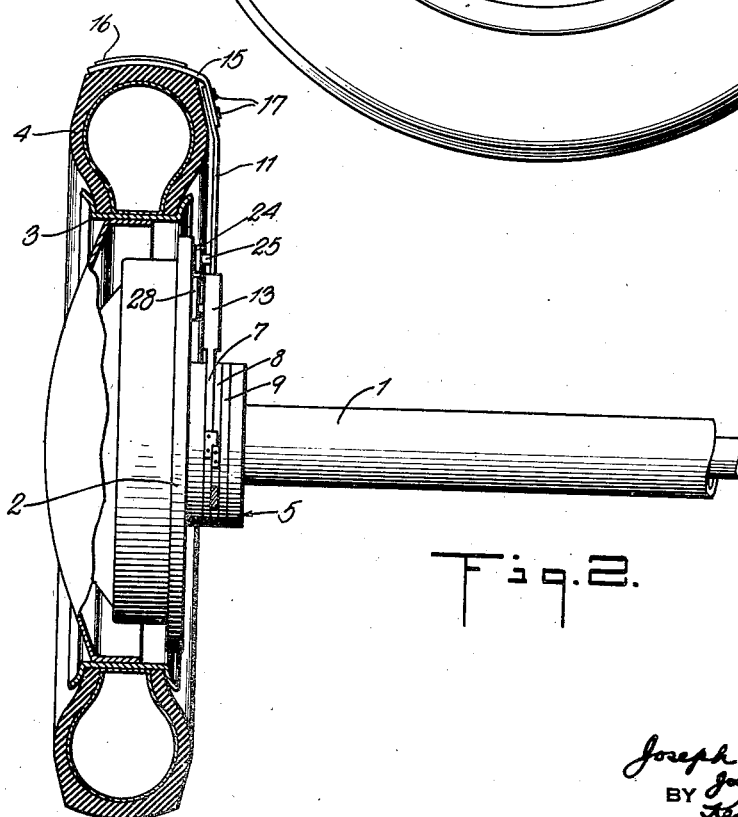
Fig. 2 is a partly sectioned end view.

More specifically, these drawings illustrate the axle housing 1 and inner brake assembly cover plate 2 of an automobile's powered rear wheel assembly, these parts 1 and 2 being non-rotative, and the revolving wheel 3 and pneumatic tire 4, these being all of the conventional parts that must be considered to understand this invention.

The equipment embodying the present invention includes a mount 5 fixed to the axle housing 1 right next the plate 2 and providing an annular groove 6 extending completely around the housing 1 and journaling individually revolvable rings 7, 8 and 9. These rings respectively mount radial arms 10, 11 and 12 to provide a series of these arms mounted, as described, for concentric revolution respecting the wheel and its tire and to individually swing respecting each other. These arms are mounted by the rings through slip joint connections 13 so that they may retract radially, and they are biased to retracted positions by springs 14. The outer ends of the arms have elements 15 overlying the tread of the tire 4, the springs 14 biasing these elements 15 into contact with the tread. These elements 15 carry anti-skid bars 16 and are releasably fixed to the various arms by screws 17, whereby they may be removed when the bars 16 become worn, the idea being to provide other elements 15 having new bars 16 whenever this becomes necessary.

As shown by Figs. 10 and 11 where the ring peripheries are developed, the periphery of the ring 7 has an abutment 18 overhanging the periphery of the next ring 8, the latter having a follower 19 for this abutment 18 and, peripherally spaced therefrom, having its own abutment 20 with the next ring 9 having a follower 21 therefor. It is to be understood that there may be more rings and more arms, in which event the ring 9 would also have its own abutment overhanging the next ring which would then be provided with its follower, and so on throughout the series. The arrangement is such that when the radial arm 10, which may be considered the leading one of the series, is swung to the left, respecting the group shown in Fig. 3, that after it swings a part of a revolution, the abutment 18 of the ring 7, mounting this arm 10, engages the follower 19 so that the ring 8 starts to turn, this effecting swinging of the arm 11 mounted by this ring, and after the arm 10 has swung through more of a revolution, and the arm 11 through a lesser part of a revolution, the abutment 20 on the ring 8 engages the follower 21 and starts to swing it. At this time, the arms should be equidistantly spaced, the springs 14 forcing the elements 15 inwardly against the tire tread and the equipment providing the anti-skid protection desired, all as illustrated in Fig. 1. The system just described is an example of overrunning means for individually interlocking against respective swinging each preceding one of the arms with each succeeding one after their respective swinging for a predetermined distance, so that by revolving the leading one of the series the same fans out and by restraining the leading one while the series is revolving the same groups closely together.

The arm 10 is provided with a cam follower, in the form of a roller 22 mounted on the arm 10 through a horizontal shaft 23. Also, the other two arms are similarly provided, the arm 11 having its roller 24 mounted by a shaft 25, and the arm 12 having its roller 26 mounted by a shaft 27.

By making the shaft 25 a little longer than the shaft 23, and the shaft 27 still longer, the rollers 22, 24 and 26 are all arranged in alignment, they all revolve with their inner surfaces working through the same orbit concentrically respecting the wheel axis.

A lever 28 is fixed to the plate 2 by a pivot pin 29 above the center of the wheel and with this pivot pin 29 opposite the turning direction of the wheel, its lever arm swinging radially respecting the wheel and being arranged parallel and adjacent the revolving path of the arms a little inside the orbit through which the various cam followers or rollers revolve. The top of this lever 28 mounts cams 30, 31 and 32 for the rollers 22, 24 and 26 respectively. These cams are preferably made of elastically yielding material such as soft rubber. The swinging end of the lever 28 carries a stop 33, and there is a stop 34 on the connection 13 of the leading arm 10.

The arrangement of these cams and of the stop, and of the stop associated with the leading arm 10, in such that when the lever 28 is swung upwardly the cams engage the cam followers or rollers on the various arms, and the stops 33 and 34 inter-engage, while with downward swinging of the lever 28 all of these various parts are free from inter-engagement. A hydraulic motor 35 is provided for swinging the lever 28 upwardly, the weight of the lever effecting its downward movement. This motor 35 may be remotely operated, the pump for providing its power being adapted for location at the seat of the driver of the car.

To operate the equipment, and assuming the equipment is working to perform its anti-skid function, that is to say the parts will be as shown by Fig. 1, the driver works the pump at his seat so as to power the motor 35, this swings the lever 28 upwardly, and the various rollers 22, 24 and 26 can now engage the cams 30, 31 and 32. If either of the rollers 24 and 26 are approaching the cams at this time, it being remembered that the arms are being forced to revolve due to the springs 14 biasing the elements 15 against the tire tread, they will simply momentarily ride over the cams and keep on going. When the roller 22, associated with the leading arm 10, reaches the cams it bounces over the cams 32 and 31 until it reaches the cam 30. The stops 33 and 34 then inter-engage so that the arm 10 comes to rest, the cam 30 working against its roller 22 so as to force the arm 10 outwardly and free its element 15 from the tire tread. Next, along comes an arm 11, its roller 24 bouncing over the cam 33, hitting the roller 22 and, finally, coming to rest on the cam 31, whereby its element 15 is also free from the tire tread. The same thing happens in the case of the last arm 12, its roller 26 hitting the roller 24 and coming to rest on the cam 32. By making these cams of soft rubber, the rollers sink into them a little and automatically center themselves respecting the cams. This brings the equipment to the status shown by Fig. 3, the anti-friction elements being held up securely in inoperative position, the rollers all being snugly held against the rubber cams by the springs 14. Now the arms are swung to positions where they closely group free from the surface ridden by the wheel and tire.

To get the equipment back to its operative condition, the driver de-energizes the motor 35 by releasing the pressure on it, the lever 28 then dropping, the stops 33 and 34 disengaging, and the cam 30 lowering so that the leading arm retracts and its element 15 engages the tire tread. When the lever 28 is pivoted as described, the cam 30 permits the roller 22 to lower a little more rapidly than the cam 31 permits its roller to lower, the leading arm 10 therefore starting to revolve first. Very shortly thereafter, the cam 31 permits its roller 24 to lower enough so that the element 15 on the arm 11 engages the tire tread so that it starts to revolve, the stop 18 on the ring 7 having, in the meantime, engaged the follower 19 on the ring 8 so that the latter swings the arm 11 to its properly spaced position respecting the arm 10. The cam 32, being close to the pivot pin 29, is the slowest to lower, the abutment 20 overhanging the ring 9 having, at about that time, engaged the follower 21 on the ring 9, this ring 9 then swinging the arm 12 to its properly spaced position respecting the arm 11. In this fashion, the equipment is rendered operative, the arms now being in positions where they are equally spaced and must revolve with the wheel and tire. When the equipment is working, the various springs 14 urge the various elements 15 tightly against the tire tread.

The connections 13 permit the various arms to retract sufficiently so that the elements 15 can give as the tire elastically gives, the arms contracting radially with the elastic working of the tire, as required. Furthermore, the connections 13 should provide for sufficient retraction of the arms to prevent breakage of any of the parts in the event the tire 4 flattens completely, such as might occur in the case of a puncture or a blow out.

Although the example, used here to specifically illustrate the principles of the equipment, is considered preferable at the present time, its form may be changed by the use of equivalents. For instance, there are other methods of mounting the various arms so that they can revolve with the wheel and individually swing respecting each other, and there are other ways in which the arms may be interconnected to provide the effect disclosed. The same possibility exists in the case of the connections 13 providing for retraction of the arms, it being possible to eliminate these connections by making the various arms, or the elements 15, of material that is elastically yieldable to a sufficient degree to accommodate the elastic working of the tire and to prevent breakage in the event the tire completely flattens, and to provide means which function simply to provide for moving the elements 15 away from the tire tread when the equipment is rendered inoperative. The use of the elements 15, to make the arms revolve with the wheel, is simple and practical, but other means for clutching the arms to the wheel might be substituted.

We claim:

1. Wheel anti-skid equipment including a series of radial arms having means for mounting them adjacent and parallel the wheel to be protected for concentric revolution respecting said wheel and to individually swing circumferentially respecting each other between positions where they closely group free from the surface ridden by said wheel and positions where they are circumferentially spaced, means for swinging said arms between said positions, said swinging means including a series of rings journaled about the axle of said wheel with means for causing their successive interlocking upon rotation in the wheel's driving direction with each ring connecting with one of said arms, anti-skid means for said wheel carried by the outer ends of said arms, and means for revolving said arms with said wheel when they are in their circumferentially spaced positions.

2. Wheel anti-skid equipment including a series of radial arms having means for mounting them adjacent and parallel the wheel to be protected for concentric revolution respecting said wheel and to individually swing circumferentially respecting each other, overrunning means for individually interlocking against respective swinging each preceding one of said arms with each succeeding one after their respective swinging for a predetermined distance, so that by revolving the leading one of said series the same fans out and by restraining said leading one while said series is revolving the same groups closely together, said overrunning means including a series of rings journaled about the axle of said wheel with means for causing their successive interlocking upon rotation in the wheel's driving direction with each ring connecting with one of said arms, anti-skid means for said wheel carried by the outer ends of said arms, releasable means for revolvingly engaging said leading arm of said series with said wheel and also succeeding ones of said series as the latter fans out, and releasable means for restraining said leading arm against revolving with said wheel when said arm reaches an upward position.

3. Wheel anti-skid equipment including a series of radial arms having means for mounting them adjacent and parallel the wheel to be protected for concentric revolution respecting said wheel and to individually swing circumferentially respecting each other, overrunning means for individually interlocking against respective swinging each preceding one of said arms with each succeeding one after their respective swinging for a predetermined distance, so that by revolving the leading one of said series the same fans out and by restraining said leading one while said series is revolving the same groups closely together, said overrunning means including a series of rings journaled about the axle of said wheel with means for causing their successive interlocking upon rotation in the wheel's driving direction with each ring connecting with one of said arms, said arms being radially retractable and having outer end elements overlying the tread of said wheel and engaging the same when said arms are retracted, means for biasing said arms retractively, and a releasable stop and cam means for positioning in the revolving path of said retractable arms above the center of said wheel, said leading arm only engaging said stop and said cam means functioning to cam said leading arm upwardly against its bias as it engages said stop and to do the same successively for succeeding ones of said arms to successively cam their said end elements from said wheel tread as they closely group together, said cam means functioning when released to permit retraction of said leading arm first and then of succeeding arms one at a time.

4. Wheel anti-skid equipment including a series of radial arms having means for mounting them adjacent and parallel the wheel to be protected for concentric revolution respecting said wheel and to individually swing circumferentially respecting each other, overrunning means for individually interlocking against respective swinging each preceding one of said arms with each succeeding one after their respective swinging for a predetermined distance, so that by revolving the leading one of said series the same fans out and by restraining said leading one while said series is revolving the same groups closely together, anti-skid means for said wheel carried by the outer ends of said arms, releasable means for revolvingly engaging said leading arm of said series with said wheel and also succeeding ones of said series as the latter fans out, and releasable means for restraining said leading arm against revolving with said wheel when said arm reaches an upward position, said arm mounting means and said overrunning means for interlocking said arms comprising a series of parallel rings that are individually revolvable and which successively mount the inner ends of successive ones of said arms, the periphery of the one of said rings mounting said leading arm having an abutment overhanging the next one and the latter having a follower for said abutment and peripherally spaced therefrom having its own abutment with the next ring thereto having a follower therefor and its own abutment and so on throughout said series.

5. Wheel anti-skid equipment including a series of radial arms having means for mounting them adjacent and parallel the wheel to be protected for concentric revolution respecting said wheel and to individually swing circumferentially respecting each other, overrunning means for individually interlocking against respective swinging each preceding one of said arms with each succeeding one after their respective swinging for a predetermined distance, so that by revolving the leading one of said series the same fans out and by restraining said leading one while said series is revolving the same groups closely together, said overrunning means including a series of rings journaled about the axle of said wheel with means for causing their successive interlocking upon rotation in the wheel's driving direction with each ring connecting with one of said arms, said arms being radially retractable and having outer end elements overlying the tread of said wheel and engaging the same when said arms are retracted, means for biasing said arms retractively, a lever adapted to be pivoted above the center of said wheel with its pivoted end opposite the turning direction of said wheel and with its lever arm swinging radially respecting said wheel and arranged parallel and adjacent the revolving path of said arms, cam members spaced along said lever arm and a stop on its swinging end, cam followers on said arms for camming said arms against said retracting bias when following said cams, a stop on said leading arm for engaging the first-named stop, and means for swinging said lever arm radially respecting said wheel to effect inter-engagement of said stop and also of said cams and cam followers and for reversely swinging said lever arm to effect disengagement thereof.

6. Wheel anti-skid equipment including a series of radial arms having means for mounting them adjacent and parallel the wheel to be protected for concentric revolution respecting said wheel and to individually swing circumferentially respecting each other, overrunning means for individually interlocking against respective swinging each preceding one of said arms with each succeeding one after their respective swinging for a predetermined distance, so that by revolving the leading one of said series the same fans out and by restraining said leading one while said series is revolving the same groups closely together, said arms being radially retractable and having outer end elements overlying the tread of said wheel and engaging the same when said arms are retracted, means for biasing said arms retractively, a lever adapted to be pivoted above the center of said wheel with its pivoted end opposite the turning direction of said wheel and with its lever arm swinging radially respecting said wheel and arranged parallel and adjacent the revolving path of said arms, cam members spaced along said lever arm and a stop on its swinging end, cam followers on said arms for camming said arms against said retracting bias when following said cams, a stop on said leading arm for engaging the first-named stop, and means for swinging said lever arm radially respecting said wheel to effect inter-engagement of said stop and also of said cams and cam followers and for reversely swinging said lever arm to effect disengagement thereof, said arm mounting means and said overrunning means for interlocking said arms comprising a series of parallel rings that are individually revolvable and which successively mount the inner ends of successive ones of said arms, the periphery of the one of said rings mounting said leading arm having an abutment overhanging the next one and the latter having a follower for said abutment and peripherally spaced therefrom having its own abutment with the next ring thereto having a follower therefor and its own abutment and so on throughout said series.

JOSEPH W. RICHARDSON.
JOSEPH CUNEO.

REFERENCES CITED

The following references are of record in the file of this patent:

UNITED STATES PATENTS

| Number | Name | Date |
| --- | --- | --- |
| 1,846,335 | Hughes | Feb. 23, 1932 |
| 1,878,386 | Douthitt | Sept. 20, 1932 |
| 1,939,771 | Erwin | Dec. 19, 1933 |